Patented Feb. 13, 1923.

1,444,844

UNITED STATES PATENT OFFICE.

KARL P. McELROY, OF WASHINGTON, DISTRICT OF COLUMBIA, ASSIGNOR TO ROBESON PROCESS COMPANY, OF NEW YORK, N. Y., A CORPORATION OF NEW JERSEY.

MAKING EMULSIONS.

No Drawing. Application filed March 3, 1921. Serial No. 449,564.

*To all whom it may concern:*

Be it known that I, KARL P. McELROY, a citizen of the United States, residing at Washington, in the District of Columbia, have invented certain new and useful Improvements in Making Emulsions, of which the following is a specification.

This invention relates to making emulsions; and it comprises a process of making permanent emulsions of oily materials, such as linseed oil, tar oils, etc., wherein sulfite waste liquor is given an enhanced emulsifying power by incorporation thereinto of a protective colloid consisting of a sulfated oil or hydrocarbon and is thereafter emulsified with the desired oil; and it comprises as a new material a sulfite waste liquor of enhanced emulsifying power, said sulfite waste liquor preparation containing a small amount of a sulfated oil or hydrocarbon as a protective colloid; all as more fully hereinafter set forth and as claimed.

Sulfite waste liquor is the liquid produced in making paper pulp or cellulose by the digestion of wood or woody materials with acid sulfite solutions. As it comes from the digesters, it is a solution containing various substances formed by mutual reaction of wood components ("lignone") with the acid sulfite; the acid sulfite and sulfurous acid, as such, for the most part disappearing. As these substances have, to a large extent, the properties of salts of sulfonic acids (lime and magnesia salts, usually), they are, for the sake of convenience of nomenclature, usually called lignosulfonates; and this name may be here adopted.

Various concentrated preparations may be made from sulfite waste liquor by evaporation; but usually for commercial purposes, it is neutralized, or nearly so, prior to evaporation (Patent No. 833,634). These neutralized liquors give the best preparations. As a rule where evaporation is not carried to dryness, a 30° Baumé material is made, this being a standard commercial strength. These materials find many uses, and particularly as adhesives for making sand cores, as road dressings, as tanning preparations, etc. In such uses it is often desirable to emulsify the sulfite liquor with oils of one kind or another. It is the purpose of the present invention to improve the liquor for such compounding operations.

I have discovered that sulfite liquor preparations can be made better emulsifying agents for oils by the expedient of blending therewith small amounts of sulfated or sulfonated bodies derived from various materials of an oily or hydrocarbon nature. While the lignonesulfonates contained in solution in the liquor are in and of themselves fairly good emulsifying agents for oils of fatty and hydrocarbon nature, I have found that the permanency of the emulsions is much improved by the presence of minimal amounts of sulfonates of more oily or hydrocarbon nature; these bodies acting apparently as what are known as "protective colloids." Either the free sulfonic acids or their salts may be used.

As is well known, sulfuric acid reacts with many hydrocarbons and oily materials to form new sulfur-containing bodies of acid nature, or sulfonic acids. These bodies, and the compounds or salts formed on neutralizing with alkali (potash or soda) are miscible with aqueous liquids and also with oils. In a general way, their miscibility with oils is the greater and their miscibility with water is the less, the more oily the material treated with sulfuric acid; and vice versa. For the present purposes I find it is better to use sulfated materials made from substances of pronounced oily or hydrocarbon character. The heavy coal tar oils when sulfonated make good preparations for my purposes. Benzene sulfonic acid, cresol sulfonic acids, xylene sulfonic acids, etc., are applicable. Sulfated or sulfonated vegetable oils, such as the ordinary "Turkey red oil" work well for my purposes. The best preparation I have found however are certain materials made in the purification of petroleum oils and products with sulfuric acid.

In refining petroleum oils and petroleum products it is customary to agitate them with sulfuric acid. Sometimes the fuming acid is used. After the agitation, the acid is separated as "sludge" and the oil is then washed with caustic soda lye. After the treatment, the soda is removed as a whitish magma or mixture containing the excess of soda, various sodium salts and more or less emulsified oil. The action of sulfuric acid on petroleum oils is complex and but little understood, but one result is to produce various sulfated and sulfonated hydrocarbons and oils, the nature of which is not definitely known. To some extent these products remain dissolved in the oil under treatment and are extracted by the soda as sodium salts, and to some extent they go into the sludge acid as free acids. The oil separated from the sludge acid by dilution with water contains these free acids. On treating it with caustic soda, sodium salts are produced. Sodium salts of these acids are also produced by direct neutralization of the acid sludge with sodium carbonate or hydroxid; these salts however in this case being of course mixed with relatively large amounts of sodium sulfate, tar, etc.

The oily acids, or their salts, from any of these sources may be used in the present invention; but it is usually most convenient to employ the sodium salts in the form of the "soda sludge" formed in washing the treated oil with caustic soda lye since this is a material regularly produced in oil refineries and is of little commercial value. Instead of washing the oil or oils or neutralizing the sludge acid with soda, potash can be employed.

Soda sludge from the treatment of heavy oils, such as lubricating oils, is better for the present purposes than similar residues from lighter oils, such as kerosene. Asphalt-base lubricating oils yield a particularly good material. The soda sludge may be used as it is or may be settled or centrifuged to separate most of the aqueous portion, which carries more or less caustic soda, sodium sulfate, etc., in solution.

The amount of any of the sulfonated or sulfated bodies which it is desirable to use with the sulfite liquor is usually quite small. Ordinarily I do not desire to use more than a per cent or so of the crude soda sludge or of the other material mentioned. With this small proportion of added sulfonic acid or sulfonates the properties of the sulfite liquor which make it technically valuable as an adhesive, for tanning, etc., are not substantially changed while its emulsifying power for fatty oils and mineral oils is much enhanced. It is usually not very material whether the acid, or its salts be employed.

In a specific embodiment of the present invention presuming a linseed oil emulsion is to be made with concentrated sulfite liquor of the standard-commercial strength of 30° Bé., using crude soda sludge as a protective colloid, I warm the liquor with about one per cent by weight of such sludge. The sludge readily goes into solution without substantially affecting the appearance or the properties of the liquor except in so far as bettering the emulsifying properties is concerned. The treated liquor may be stored or kept indefinitely. The treated liquor is next emulsified with linseed oil in any of the usual ways or by use of any of the commercial apparatus adapted for emulsification purposes. Usually it is best to warm the liquid somewhat in order to increase its fluidity and to make the oil additions slowly or in successive small portions while vigorously agitating the liquor. Emulsification is quicker than with untreated liquor and smooth, permanent emulsions are obtained. Emulsions of petroleum oils, asphalt oils, etc., are made in the same way and with the same result. The emulsions may be used as core binders, road binders, briquette binders, etc.

Crude acid preparations, such as result from treating castor oil or olive oil, naphthalene, benzene, xylenes, coal tar oils, anthracene oils, cresols, xylols, etc., with sulfuric acid, may be directly added to the sulfite liquor, the excess of sulfuric acid, if not too great, precipitating with the lime of the liquid as calcium sulfate. Or such acid preparations may of course be first neutralized and then added. If neutralization is with lime, the excess of sulfuric acid is separated as insoluble calcium sulfate and the clear solution of calcium sulfonate may then be added. With the small proportions of sulfated products which I use, however, either the crude oil preparations; such as those made by treating oils and hydrocarbons with sulfuric acid, or alkaline materials, such as the described soda sludge, can be added directly to the sulfite waste liquor preparation without material change in its reaction as regards alkalinity or acidity, the reaction being, if desired adjusted afterwards. Ordinarily I prefer to have my treated liquor neutral or rather alkaline where it is to be used for emulsifying oils.

What I claim is:—

1. In the emulsification of sulfite liquor preparations with oils the process which comprises dissolving a sulfated oily material in the liquor and thereafter emulsifying with the desired oil.

2. In the improvement of sulfite liquor preparations for emulsification purposes the process which comprises dissolving therein sulfated material of petroleum character.

3. In the improvement of sulfite liquor preparations for emulsification purposes the process which comprises dissolving therein soda sludge from petroleum refining.

4. A sulfite waste liquor preparation containing a small amount of dissolved sulfated oily material and emulsified oil.

5. A sulfite waste liquor preparation containing a small amount of dissolved soda sludge from petroleum refining.

6. A sulfite waste liquor preparation containing a small amount of dissolved soda sludge from petroleum refining and emulsified oil.

In testimony whereof, I have hereunto affixed my signature.

K. P. McELROY.